United States Patent Office 3,386,546
Patented June 4, 1968

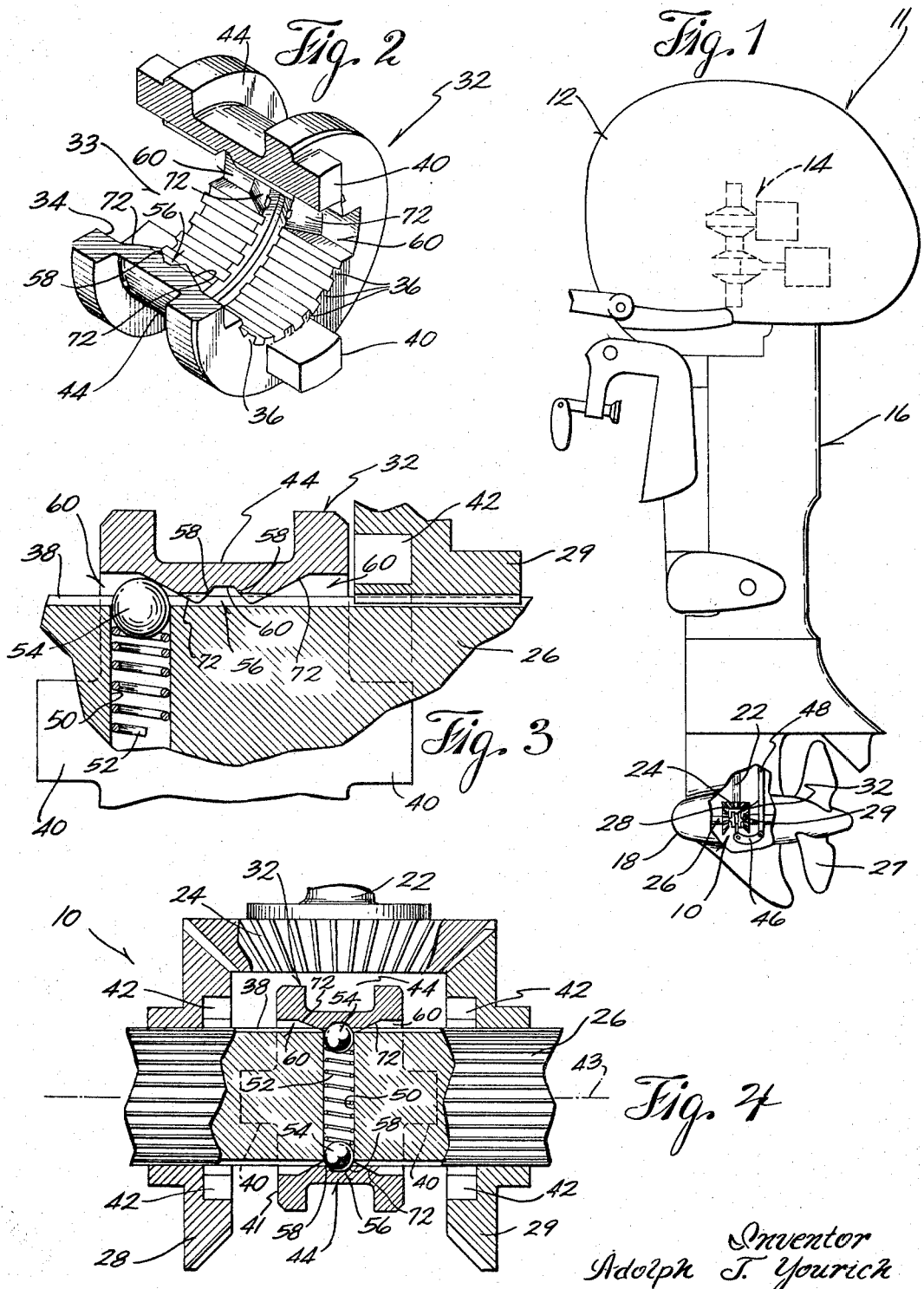

3,386,546
REVERSIBLE CLUTCH TRANSMISSION
Adolph J. Yourich, Waukegan, Ill., assignor to Outboard Marine Corporation, Waukegan, Ill., a corporation of Delaware
Filed Mar. 2, 1966, Ser. No. 531,156
6 Claims. (Cl. 192—51)

ABSTRACT OF THE DISCLOSURE

Disclosed herein is a marine propulsion device having a shifter dog for selectively and respectively providing driving engagement with a pair of spaced driving gears in response to engagement of said shifter dog with said drive gears, together with detent means for holding said shifter dog in a neutral position and for affording movement of said shifter dog from said neutral position upon application of an external force on said shifter dog above a predetermined amount, and ramp means cooperating with a portion of said detent means to afford rapid movement of said shifter dog into selective respective engagement with said drive gears in response to application of said force.

---

This invention relates to transmissions, and more particularly, to transmissions for marine propulsion devices.

Such transmissions commonly include at least one drive gear connected to and driven by a suitable source of power, a driven shaft rotatably carrying the drive gear, and a shifter clutch dog rotatably carried on the driven shaft proximate the drive gear for axial movement relative to the driven shaft to and from positions engaged with the drive gear. For this purpose, the shifter clutch dog is splined to the driven shaft and can be selectively moved in directions affording engagement with the drive gear. The shifter dog has thereon one or more driving lugs which engage complementary driving lugs on the drive gear. Thus, when the drive lugs on the shifter clutch dog and the drive gear engage each other, the drive gear drives the shifter clutch dog which, in turn, drives the driven shaft to afford a drive condition of the transmission.

An object of the invention is to provide a transmission having a shifter clutch dog which is reliably rapidly moved into engagement with a drive gear during clutch engagement. Such rapid engagement of the shifter clutch dog prevents the shifter dog for ratcheting in and out of partial engagement with the drive gear, which occurs when the shifter clutch dog is moved too slowly, to thereby ultimately reduce excessive wear and failure of the parts.

Another object of the invention is to provide a transmission having a shifter clutch dog which is urged or held in engagement with the drive gear to thereby prevent unwanted disengagement of the transmission.

In accordance with the invention, means are provided for affording rapid axial movement of the shifter clutch dog into driving engagement with the drive gear in response to an axial motive force on the shifter dog above a predetermined force. Said means comprises detent means for maintaining the shifter clutch dog in a neutral position wherein the transmission is in a neutral drive condition, and for requiring an axial motive force on the shifter clutch dog which is above a pre-determined level to afford movement of the shifter clutch dog from the neutral position. Said means for affording rapid axial movement further includes inclined ramp means which is associated with the detent means and which cooperates with a part of the detent means to afford rapid movement of the shifter dog into engagement with the drive gear and to further afford holding of the shifter clutch dog in engagement with the drive gear thereby preventing disengagement of the transmission from a drive condition.

Other objects, advantages and features will become apparent from the following description and accompanying drawings in which:

FIGURE 1 is a side elevational view, with parts broken away, of a marine propulsion device incorporating a transmission embodying various of the features of the invention;

FIGURE 2 is an enlarged, perspective view of the shifter clutch dog embodied in the transmission of the invention;

FIGURE 3 is an enlarged, fragmentary view, partially in section, of a portion of the transmission shown in FIGURE 1 and showing the shifter clutch dog engaged with one of the drive gears; and FIGURE 4 is an enlarged, partially cross sectioned view of the transmission shown in FIGURE 1.

Referring now to the drawings and more particularly to FIGURE 1, the transmission of the invention is broadly identified by the numeral 10, and because of its particular adaptability for use with a marine propulsion device, though not limited to such, the transmission 10 of the invention is exemplarily shown and described in conjunction with a marine propulsion device 11. The marine propulsion device 11 generally comprises a power head 12 including the internal combustion engine 14. The power head 12 is carried on a lower unit 16 having a gear case 18 in which is carried the transmission 10. Extending through the lower unit 16 and operatively connected to the internal combustion engine 14 is a drive shaft 22 having thereon a driving bevel gear 24.

The transmission 10 comprises a driven or propeller shaft 26 which is journalled in the gear case 18 and disposed transversely of the drive shaft 22. The propeller shaft 26 has an end which extends through the gear case 18 and which carries thereon a propeller 27. Within the gear case 18, a pair of oppositely disposed and spaced, beveled drive gears 28 and 29 are rotatably carried on the propeller shaft 26 and are meshed with the driving gear 24.

Also included as part of the transmission 10 is a shifter clutch dog 32 which is splined to the propeller shaft 26 between the drive gears 28 and 29 to provide axial movement of the shifter dog 32 into engagement with either of the gears 28 and 29 and to further provide common rotation of the shifter dog 32 with the propeller shaft 26. For this purpose, the shifter dog 32, which is generally a cylindrical member, includes a central bore 33 defining an interior surface 34 having thereon splines 36 which receive complementary splines 38 on the propeller shaft 26.

Means on the shifter dog 32 are provided for affording selective driving connection of the shifter dog 32 with either of the drive gears 28 and 29 upon respective engagement of the shifter dog 32 with the drive gears 28 and 29. Engagement of the shifter clutch dog 32 with drive gear 28 affords a forward drive condition, and conversely, engagement of the shifter clutch dog 32 with drive gear 29 affords a reverse drive condition. Such means comprises one or more driving lugs 40 on opposite end faces 41 of the shifter dog 32. The lugs 40 are disposed to engage complementary drive lugs 42 (see FIGURES 3 and 4) on the drive gears 28 and 29. Thus, with the shifter dog 32 in a neutral position as shown in FIGURE 4, the drive gears 28 and 29 are driven by the gear 24 and rotate relative to the propeller shaft 26 which does not rotate, to thereby provide a neutral drive condition. Axial movement of the shifter dog 32 in either axial direction affords driving engagement of the lugs 40 and 42 with each other whereupon the propeller shaft 26 is driven in either a forward or reverse drive condition depending on which drive gear 28 and 29 is engaged by the shifter clutch dog 32.

To facilitate shifting, or axial movement of the shifter dog 32, the outer surface of the shifter dog 32 includes thereon an annular groove 44 which receives a shifter fork 46, shown in FIGURE 1. The shifter fork 46 is operatively connected to an actuating rod 48 which extends through the lower unit 12 and which is actuated by a remote control lever (not shown).

Means are provided for affording rapid axial movement of the shifter dog 32 into driving engagement with either of the forward and reverse gears 28 and 29 in response to application of an axial motive force on the shifter dog 32 in either direction and above a predetermined level or amount. Said aforementioned means is also effective to hold the shifter dog 32 in engagement with the drive gears 28 and 29 under a predetermined axial holding force. In the preferred embodiment, said means for affording rapid axial movement comprises a detent means which maintains the shifter dog 32 in a neutral position and which requires an axial motive force above a predetermined level to disengage the shifter dog 32 from the detent means.

Said means for affording rapid axial movement further comprises ramp means which is associated with the detent means and which cooperates with a part or portion of said detent means to afford rapid movement of the shifter dog 32 in a direction affording driving engagement thereof with one of the drive gears 28 and 29. The ramp means, in conjunction with a part of the detent means, also affords holding the shifter dog 32 in engagement with the drive gears 28 and 29.

In the illustrated embodiment, the detent means includes a radial bore 50 in the propeller shaft 26 and an energy storing device housed in the bore 50. The energy storing device comprises a spring 52 carried in the radial bore 50, and balls 54 disposed at the opposite ends of the spring 52 so that the balls 54 are urged, oppositely outwardly of the radial bore 50 by the bias of the spring 52. This invention is not limited to two oppositely disposed balls but contemplates use of one or more balls 54. The detent means further includes a groove 56 on the interior surface 34 of the shifter clutch dog 32. The groove 56 may extend around the entire circumference of the interior surface 34 and is disposed to receive the oppositely, outwardly biased balls 54 to afford holding or maintaining of the shifter dog 32 in the neutral position, as shown in FIGURE 4.

To move the shifter dog 32 from the neutral position, an externally applied axial motive force above a predetermined amount is required. The magnitude of the motive force is dependent on, among other things, the depth of the groove 56, the angle of the groove side walls, the diameter of the balls 54, and the amount of biasing force exerted by the spring 52. In the preferred embodiment, the groove 56, in transverse cross section, has oppositely, outwardly inclined walls 58 which meet at a flat bottom 60. Less than half of each ball 54 extends into the groove 56.

Said ramp means comprise, for each ball, axial guideways 60 on the interior surface 34, which guideways 60 extend in opposite axial directions from and generally transverse of the groove 56, and run out to the opposite end faces 41 of the shifter dog 32. The axial guideways 60 increase in depth in directions away from the groove 56 to thereby define cam surfaces or inclined ramps 72.

As shown in the drawings, the inclined ramp 72 of the guideways 60 extends generally to the interior surface 34 of the shifter clutch dog and to adjacent the edge or margin of the groove 56. Thus, when the shifter clutch dog 32 is axially moved from the neutral position by an external force applied through the link 48, the balls 54 move out of the groove 56 and onto the guideways 60 whereby the balls 54 are moved toward each other against the outward biasing force of the spring 52, thus increasing the outward force exerted on the balls 54 by spring 52. Upon engagement of the balls 54 with the inclined ramps 72 of the guideways 60, the outward or radial force exerted by the spring serves to cam the shifter axially into engagement with a selected one of the drive gears 28 and 29 depending upon the direction of initial movement of the shifter by the exerted force. Once a sufficient external force has been applied to the shifter clutch dog 32 to move it from the neutral position, the shifter clutch dog 32 moves through the remainder of its travel under the action of the spring 52 in a very short time, thus effecting a rapid engagement of the shifter dog 32 with respect to drive gears.

Each inclined ramp 72 is of sufficient length to afford continued engagement with the balls 54 when the shifter dog is fully engaged with either of the drive gears 28 and 29, see FIGURE 3. When in the drive condition, the engagement of the balls 54 with the inclined ramp 72 exerts a continuous axial force on the shifter dog 32 thus holding the shifter dog 32 in engagement with either of the gears 28 and 29.

Various of the features of the invention are set forth in the following claims.

What is claimed is:

1. A transmission comprising a driven shaft, a drive gear rotatably carried on said driven shaft and adapted for connection to a source of power and having thereon splines, a shifter dog carried on said driven shaft and comprising a cylindrical member having a bore defining an interior surface having thereon splines which are engaged with said splines on said driven shaft to afford axial movement of said shifter dog relative to said driven shaft and to further afford rotation of the shifter dog with said driven shaft and into engagement with said driven gear, means on said shifter dog for affording driving connection between said shifter dog and said drive gear upon engagement of said shifter dog with said drive gear, said means for affording driving connection between said drive gear and said shifter dog comprising complementary drive lugs on said drive gear and on said shifter dog, means for automatically axially shifting said shifter dog into engagement with said drive gear in response to an externally applied motive force on said shifter dog and for affording holding of said shifter dog in engagement with said drive gear, said means for affording axial movement of said shifter dog comprising a radial bore in said driven shaft communicating with said shifter dog bore, a spring disposed in said radial bore, a ball received in said radial bore and biased by said spring toward said shifter dog, a groove disposed on said interior surface of said shifter dog to receive said ball when said shifter dog is in a neutral position, a guideway extending from the groove in a direction away from said drive gear for receiving said ball upon movement of said shifter dog from neutral position, said guideway increasing in depth in a direction away from said groove to define an inclined cam surface, whereby a force on said shifter dog above a predetermined level affords movement of said shifter dog from said neutral position whereby said ball engages said inclined cam surface and said shifter dog is moved into engagement with said drive gear under the action of said spring forcing said ball against said inclined cam surface.

2. A transmission in accordance with claim 1 wherein when said shifter dog is engaged with said drive gear, said ball is engaged with said inclined ramp thereby exerting a force on said shifter dog holding said shifter dog in engagement with said drive gear.

3. In a marine propulsion device, the combination of a lower unit including a drive shaft provided with a driving gear, a propeller shaft, a drive gear rotatably carried on said propeller shaft and disposed in meshing engagement with said driving gear, a shifter clutch dog carried on said propeller shaft for axial movement relative to said propeller shaft into engagement with said drive gear and for common rotation with said propeller shaft, said shifter dog having a bore including an interior surface and having means for affording driving connection of said shifter dog with said drive gear upon engagement of said shifter dog and said drive gear, and means for affording rapid axial movement of said shifter dog into engagement with said drive gear in response to an externally applied axial motive force on said shifter dog and for affording holding of said shifter dog in engagement with said drive gear, said last-mentioned means comprising a radial bore disposed in said propeller shaft and communicating with said shifter dog bore, an energy storing device carried in said radial bore, said energy storing device including a ball and a spring biasing said ball in a direction out of said radial bore and toward said shifter dog, a groove on said interior surface of said shifter dog, said groove receiving said ball when said shifter dog is in a neutral position to afford a neutral drive condition of said marine propulsion device, a guideway on said interior surface disposed to receive said ball upon movement of said shifter dog from said neutral position, said guideway increasing in depth in a direction away from said groove to define an inclined ramp, whereby said shifter dog is moved into engagement with said drive gear by the action of said spring forcing said ball against said inclined ramp after application of an external force which moves said shifter dog from said neutral position.

4. A device in accordance with claim 3 wherein said inclined ramp includes portions engaged with said ball when said shifter dog is engaged with said gear to thereby exert a force on said shifter dog holding said shifter dog in engagement with said drive gear.

5. The combination with a marine propulsion device having a lower unit including a drive shaft provided with a driving gear, of a propeller shaft, spaced drive gears rotatably carried on said propeller shaft and disposed in meshing engagement with said driving gear, a shifter clutch dog carried on the propeller shaft between said spaced drive gears for axial movement relative to said propeller shaft into selective engagement with said drive gears and for common rotation with said propeller shaft to afford driving of said propeller shaft in response to driving of said shifter dog, means on said shifter dog for selectively respectively connecting said shifter dog in driving engagement with said drive gears in response to respective engagement of said shifter dog with said drive gears, detent means for holding said shifter clutch dog in a neutral position and for affording movement of said shifter dog from said neutral position upon application of an external force on said shifter dog above a predeter- mined amount, and ramp means cooperating with a portion of said detent means to afford rapid movement of said shifter dog into selective respective engagement with said drive gears in response to application of said force, said portion of said detent means further cooperating with said ramp means to afford holding of said shfiter dog in respective engagement with said drive gears.

6. A combination in accordance with claim 5 wherein said propeller shaft has splines thereon, said shifter dog comprises a cylindrical member having a central bore including an interior surface having thereon splines which are engaged with said splines on said propeller shaft to afford axial movement of the shifter dog relative to said propeller shaft in either axial direction and common rotation of the shifter dog with said propeller shaft, said detent means comprising a radial bore extending through said propeller shaft and communicating with said shifter dog bore, a spring disposed in said radial bore, balls received in said radial bore and biased by said spring outwardly toward said shifter dog, a groove on said interior surface of said shifter dog disposed to receive said balls when said shifter dog is in a neutral position, and said ramp means comprising axial guideways extending from said groove in opposite directions and associated with each of said balls, said guideways being disposed to receive said balls upon axial movement of said shifter dog into respective driving engagement with said drive gears, said guideway increasing in depth in the direction away from said groove to define inclined ramps, whereby an externally applied axial motive force on said shifter dog above a pre-determined amount affords movement of said shifter dog from said neutral position whereupon said balls engage said inclined ramps and said shifter dog is moved into respective engagement with drive gears under the action of said spring forcing said balls against said inclined ramps and when said shifter dog is respectively engaged with said drive gears, said balls are engaged with said inclined ramps thereby exerting a force on said shifter dog holding said shifter dog in respective engagement with said drive gears.

References Cited

UNITED STATES PATENTS

| 2,735,528 | 2/1956 | Dodge | 192—114 X |
| 2,785,783 | 3/1957 | Homrig et al. | 192—114 |
| 2,942,712 | 6/1960 | Altmann | 192—114 |
| 3,216,392 | 11/1965 | Shimanckas | 192—51 X |
| 3,312,318 | 4/1967 | Ryan | 192—51 X |

DONLEY J. STOCKING, *Primary Examiner.*

ARTHUR T. McKEON, *Assistant Examiner.*